HIERARCHICAL SEARCH SYSTEM

Filed July 9, 1964 3 Sheets-Sheet 1

INVENTORS.
REYNOLD B. JOHNSON
ROBERT J. WOHL
BY John L. Jackson
ATTORNEY

Dec. 20, 1966 R. B. JOHNSON ET AL 3,292,489

HIERARCHICAL SEARCH SYSTEM

Filed July 9, 1964 3 Sheets-Sheet 3

United States Patent Office 3,292,489

Patented Dec. 20, 1966

3,292,489

HIERARCHICAL SEARCH SYSTEM

Reynold B. Johnson, Palo Alto, and Robert J. Wohl, San Jose, Calif., assignors to International Business Machines Corporation, New York, N.Y., a corporation of New York Filed July 9, 1964, Ser. No. 381,421

6 Claims. (Cl. 88—24)

This invention relates to the field of information retrieval in general and more particularly to a retrieval system wherein displayed human readable information and coded information associated therewith is utilized in a hierarchical or indicial system format to provide a real time man-machine search method and system.

Many various types of information retrieval systems are currently in use. In the usual information retrieval system, a request is keyed into the system and either a hard copy output of the requested results or a display is presented. The request may be by means of, for instance, a numerical description or may be in the form of key word descriptions. In the latter case, a machine-type search for matches is run which necessitates a large scale magnetic or similar type of store along with a search control processor or computer. This type of system is obviously quite expensive and is therefore economically restricted to large scale applications. A more fundamental shortcoming, however, is that once a search is instigated, it is entirely machine controlled such that there is no indication to the requestor prior to completion of a search as to whether the search is being directed toward the desired end, i.e., no man-machine communication during the course of the search.

Other problems with respect generally to keying or dialing of addresses in any type of system is that in the case of a large system, there will be an inconveniently large number of digits in the addresses and, additionally, the necessity of keying in many addresses in the course of a search may make this task quite lengthy and irksome, as well as introduce many errors.

Several efforts have been made recently to provide a search type of information storage and retrieval system wherein man-machine communication during the course of a search is employed. One such type employs a transparent conductive screen which is divided into a number of discrete areas. Information arranged in accordance with the format of the screen is projected onto the screen and the search is performed by touching the area of the screen associated with the search area of interest. At first glance, this system appears to be quite simple. However, one problem encountered in this type of system is that of complexity with resultant expense. Firstly, an associative memory (or cross index) is required. That is, in this type of system the choice of the area on the screen must be associated with the particular display from which the choice was made in order to derive an address of the next display desired. This association is performed in a memory store or an associative memory. Secondly, preparation of the displays and later revision thereof is a fairly complicated matter. This complex problem, of course, increases at least in proportion to the size of the system. Finally, in this type of system displays of graphic material (e.g., maps, etc.) often must be artificially distorted such that a referenced area will fall within a subarea of the display.

Another type of search-type information storage and retrieval system is that utilized in conjunction with a cathode ray tube viewing screen. When additional information concerning a subject being displayed on the cathode ray tube face is desired, a photocell pencil is brought into contact with the display adjacent the subject. The area contacted is identified by the time lapse after commencement of scanning of the frame. In this type of system, as in the heretofore discussed discrete area display system, an associative memory is required. Furthermore, the system necessary for decoding and correlating the information derived from the photocell pencil is complicated. This complexity gives rise to the need for a computer controller such that this type of search system is not conducive to use in the less elaborate information retrieval systems due to its high cost.

Ideally then, an information storage and retrieval system for use in search-type applications should allow man-machine communication during the course of a search. For the sake of accuracy and convenience, this communication should take place without necessity of keying or dialing or similar type steps. Moreover, the system should, to alleviate expense and complexity, not necessitate an associative memory. Finally, the display to the human operator should not be in distorted form. Other desirable characteristics such as operation in a non-computer environment so that it can be utilized in the less sophisticated storage and search applications is, of course, desirable.

It is therefore an object of the present invention to provide a novel information storage and retrieval system.

Another object of the present invention is to provide a new search-type information storage and retrieval system wherein a hierarchical or indicial search may be performed without the necessity of keying or dialing.

Another object of the present invention is to provide an information storage and retrieval system wherein displayed data is presented in a non-distorted form.

Another object of the present invention is to provide an image storage and retrieval system wherein displayed data on a viewing screen has associated therewith an optical code which is strobed with an optical sensor to provide search control signals.

Another object of the present invention is to provide an information storage and retrieval system wherein information is displayed on a viewing screen along with an associated optical code which is strobed by means of a light sensitive element to cause presentation of a series of hierarchical indexes, the next lower, more detailed level being displayed to the operator as a result of his previous choice.

The foregoing and other objects, features and advantages of the invention will be apparent from the following more particular description of preferred embodiments of the invention, as illustrated in the accompanying drawings in which.

Briefly, a system useful in hierarchical searching is provided wherein human readable information such as, for instance, descriptive titles each having an associated optical code is presented on a viewing screen. The viewing screen may either be the case of a cathode ray tube or may be a direct viewing screen in association with a projection system. The operator strobes, by means of a light sensor, the optical code associated with a subject about which he desires further information. The light sensor produces a series of pulses indicative of the code strobed, which pulses are operated on by a control means which causes additional information relating to the selected subject to be presented in the viewing screen. This procedure may be repeated any number of times such that a hierarchical search is performed.

Figure 1:
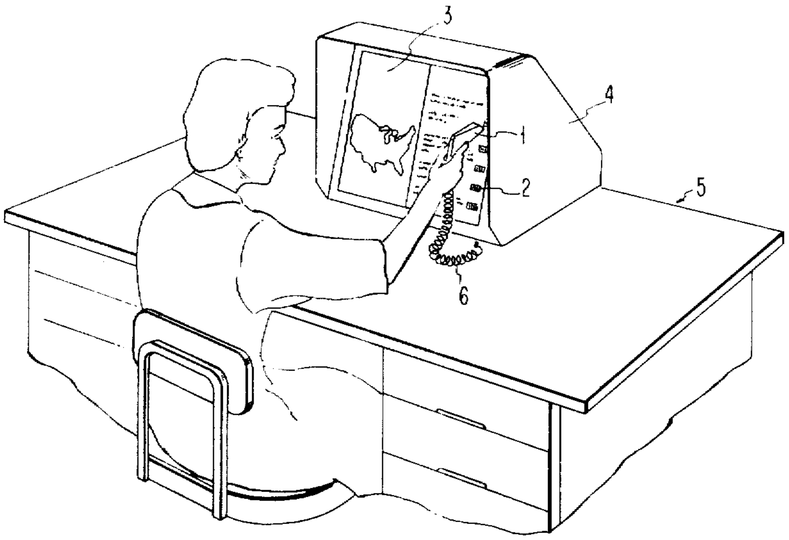
FIG. 1 is a view of a human operator conducting a search on a typical console of the subject system.

For a more detailed description, refer first to FIG. 1 wherein a human operator is shown holding a scanner 1, which, as will hereinafter be more fully discussed, can take any of several forms. The human operator in FIG. 1 is shown holding the face of the scanner 1 in optical association with an optical code 2 which is in juxtaposition with prime or human readable information presented on the face of the viewing screen 3. The viewing screen 3 is contained in a console 4 which is mounted, for purposes of illustration, on the top of a desk 5. The scanner 1 is shown connected along line 6 to the inside of the desk for communicating with the circuitry involved in the operation of the hereinafter described system.

Figure 2:
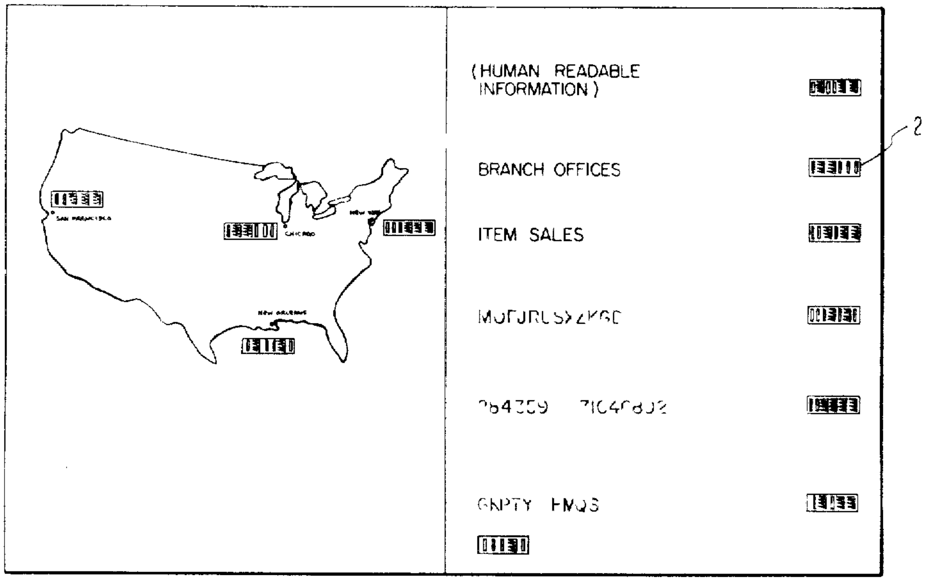
FIG. 2 is a blown-up view of the information presented on the viewing screen of the console of FIG. 1.

In FIG. 2 is shown a detailed view of the information presented on the viewing screen 3 of the display means shown in FIG. 1. This is merely for purposes of illustration and it will be understood that any number of various types of searches can be performed with the novel information storage and retrieval system herein presented. In FIG. 2, for example, is shown a map of the United States with certain cities set forth with an optical code associated with each. This display could have been the result of a previous choice by the human operator. It will be noted that the map of the United States, or for that matter any other material presented on the display, is not distorted by artificial boundaries such as in a conductive touch plate viewing screen system. In performing a search, the operator will, by means of the scanner 1, strobe an optical code associated with a category of the data presented on the viewing screen 3 about which the operator desires further information, Thus, for instance, in the example shown in FIG. 2, the operator, if he desires information at another detail level, concerning, first, San Francisco, he would strobe the code associated with the human readable words "San Francisco." Then, relying on the information associated with the map of the United States appearing on the right-hand portion of the viewing screen 3, he would then select further detailed information at another detail level concerning San Francisco. Thus, two or more search criteria may be presented simultaneously on the viewing screen 3. The choices resulting from the operator's perusal of the viewing screen would then cause, as will hereinafter be more fully described, a new source of information to be presented on the viewing screen 3 which information results from the particular choice made by the operator. This sequence continues as the operator searches through and finally obtains the sought information.

Figure 3:
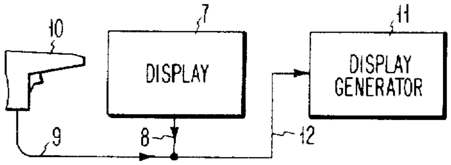
FIG. 3 is a generic block diagram of the subject information storage and retrieval system.

Refer next to FIG. 3 wherein is shown a general block diagram of the subject information storage and retrieval system. In FIG. 3 is shown a display block 7 electrically connected along line 8 to a junction which is electrically connected both along line 9 to an optoelectrical scanner 10 and along line 12 to a display generator 11. The display 7 may comprise, as heretofore mentioned, the face of a cathode ray tube or it may be a direct viewing screen or any other similar type of display means. Likewise, the scanning means 10 may comprise the hereinafter described light gun or may comprise any other type of human-held optical sensing element. Moreover, the display generator 11 itself may comprise a direct optical projection system from, for instance, a roll of film or strips of film or may comprise a remotely located system employing optical scanners, coaxial transmission and cathode ray tube display. Additionally, the display generator 11 may comprise a computer system utilized in conjunction with a cathode ray tube display wherein the generation of the display is under control of the computer.

Figure 4:
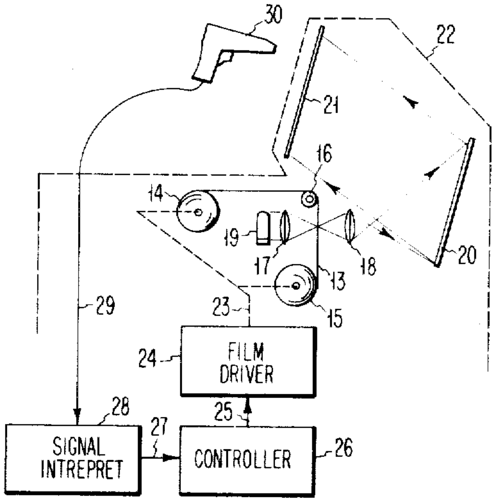
FIG. 4 is a block schematic diagram of one embodiment of the system wherein data to be searched is stored on reels.

Refer next to FIG. 4 wherein is shown an embodiment of the subject invention in which information bearing records along with related optical codes are stored on a photographic film 13 which is wound about two reels 14 and 15 and over an idler pulley 16. The reels 14 and 15 and idler 16 are mounted for rotational movement by means of bearing-shaft arrangements or any other suitable means (not shown). Two lenses 17 and 18 acting in conjunction with a light source 19 function to project selected enlarged portions of the roll of film 13 onto the face of a mirror 20 which reflects the enlarged image from the film onto the rear side of a viewing screen 21 contained in the console 22. A film driver 24 is mechanically connected by suitable means 23 to effect rotation of reels 14 and 15. The film driver 24, which may be a conventional reversible motor or stepping motor is controlled along line 25 by a record control means or controller 26 which in turn is receptive along line 27 of search control signals from a decoder or signal interpret means 28. The signal interpret means 28 in turn is electrically connected along line 29 to a scanner 30.

In operation the film 13 is initially advanced to a starting position by the film driver 24 under control of the controller 26. The starting or initial position may be actuated from the scanner by an operator or may be controlled by some other means. When the first or initial frame of the film 13 is projected onto the rear of the viewing screen 21, the human operator 32 views the information and selects a portion of the projected information about which he desires further information, as heretofore discussed. The operator then places the pistol over the coded information adjacent the data and squeezes the trigger which causes the scanner 30 to scan the optical code thereby furnishing a series of pulses along line 29 to the decoder or signal interpret means 28 which furnishes search control signals to the controller 26 to cause the film driver to cause the reels 14 and 15 to rotate such that the desired information is brought into alignment with the lenses 17 and 18 and be projected onto the rear of the viewing screen 21. This sequence is repeated any number of times until the search is completed.

With respect to the viewing screen, several factors had to be taken into consideration in the selection of the particular type of material utilized. For instance, human fatigue might result from the use of certain types of light output. Likewise, certain materials might not present an image which could be viewed in ordinary office-type ambient illumination without fatigue resulting from extended viewing periods. The material must also be a low gain, quite diffuse screen so that images appearing thereon can be viewed off axis without too severe light fall off. However, these requirements are generally antagonistic to an optimized machine reading system where, for instance, one would prefer an image optimally focused for that part of the spectrum where the sensitivity of an associated optical sensor is peaked and removal of remoter parts of the spectrum (which are out of focus) by means of filters.

Conventional ground glass or coated glass screens impart a granular structure to the image which is unpleasant and reduces the resolution capabilities of the image. Furthermore, the sharp edges of the diffusing surface cause prismatic effects which are disturbing. Since both of these difficulties also may affect the operation of the optical scanning system, other materials were considered.

One possible solution is to utilize a composite screen of ground glass with a sheet of no-glare glass between the observer and the ground glass. The no-glare glass is a coated glass which is used in picture frames to reduce the reflected glare of room lights. Its coating is much smoother than the ground glass and introduces no prismatic problems nor noticeable granularity. The reduction of light caused by the no-glare glass was negligible, yet it reduced the apparent granularity and prismatic effects of the ground glass. The coated surfaces were placed in contact, minimizing the diffusion of the image.

It will, of course, be understood that the above described combination is not critical to the present invention since a conventional ground glass screen will suffice.

Figure 5:
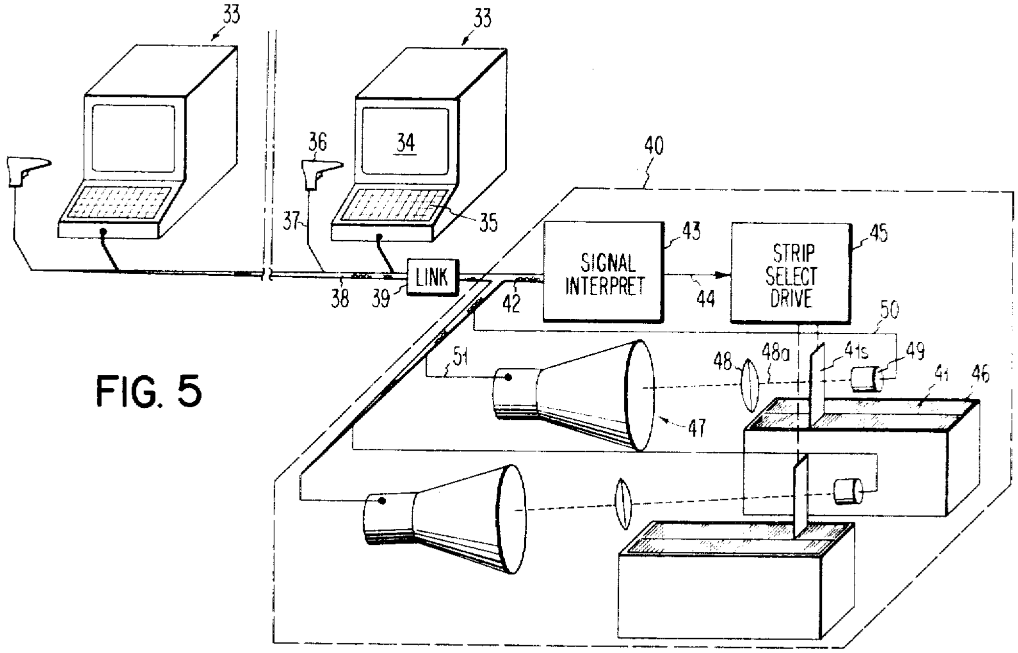
FIG. 5 is another embodiment of the subject system wherein consoles are remotely located from a central store.

Refer next to FIG. 5 which is another embodiment of the subject invention. In FIG. 5 are shown a plurality of remotely located display terminals designated generally as 33, each including a cathode ray tube type viewing screen 34 and a control panel 35. The display terminal 33 includes a pistol optical scanner 36 electrically connected along line 37 to a coaxial cable 38 which is also connected to the display console itself. The coaxial cable is connected by means of a transmission link 39 to a central store 40 which comprises, for purposes of illustration, a store of film strips 41 containing information arranged, as heretofore discussed, with an optical code associated with each of the data portions. The coaxial cable 42 from the transmission link 39 is connected to a decoder or signal interpret means 43 which in turn is electrically connected along line 44 to a record or strip select drive 45 which in turn selectively withdraws chips from the large chip store 46 and positions them in scanning alignment with a cathode ray tube 47. A lens 48 is provided for focusing the light output of the cathode ray tube 47 onto the selected film strip 41s. A photodetector 49 is placed on the opposite side of the selected film strip 41s in optical association with the light from the scanner 47 passing therethrough. The photodetector is electrically connected along line 50 to the coaxial cable 42. The cathode ray tube is electrically connected by line 51 to the coaxial cable 42 along and through the transmission link 39 by means of the coaxial cable 38 to the display units 33 for sweep synchronization. The particular structure of the strip select drive will not herein be set forth since there are any number of ways of selecting strips and bringing them into optical association with a cathode ray tube scanning system responsive to signals received from a unit such as the signal interpret means 43, which acts as a decoder to provide, as hereinafter described, control address signals unique to each of the strips 41 in the store. One such means is shown and described in an application entitled "Direct Access Photo Memory," Serial No. 786,406, filed January 12, 1959, now U.S. Patent No. 3,149,529 assigned to the same assignee as the present application. Additionally, while the before and following description is of a single store 46 and single cathode ray tube central store, it will be understood, as illustrated in the drawings, that a system wherein a plurality of stores and associated cathode ray tubes is contemplated.

In operation, an operator initiates a mode of operation by means of the control panel to position a selected portion of a selected chip on the optical axis 48*a*. This may be by depressing a key to select a general search area or may be a "start" button or may be by keying in an address. The operator then peruses the displayed information on the face of the cathode ray tube 34 and chooses a selected portion of the information for more detailed analysis. The pistol scanner 36 is then placed over the optical code, "fired," as will hereinafter be described in more detail, and the code pulses from the pistol appearing on line 37 serially transmitted along the coaxial cable 38 through the transmission link 39 to the decoder or signal interpret means 43. The coded signals are resolved in the signal interpret means 43 and search control signals appear on line 44 which are utilized to cause the record control means 45 to selectively position a desired strip 41 with a selected portion of information in scanning association with the cathode ray tube scanner

47. This video information from the photodetector 49 is then transmitted back over the coaxial cables through the transmission links to the display for further operator perusal and searching, as heretofore discussed.

In the test system actually built, the first type of scanner that was investigated was that of a pencil type scanner which was handheld by the human operator and moved over the associated optical code. A slit was provided in front of the photocell contained in the scanner to help reduce reflections to provide a usable signal. However, due to the light losses in the optical system and resolution problems, the signal was so reduced that it was necessary to open the slits such that the signal-to-noise ratio of the derived signal was intolerable. Other sources of error included problems in maintaining a proper azimuthal relationship between the slits and the line of code and those of yawing of the pencil from the normal to the screen which lead to velocity, misregistration and focusing problems. The above problems lead to the choice of the configuration shown in FIG. 6.

Figure 6:
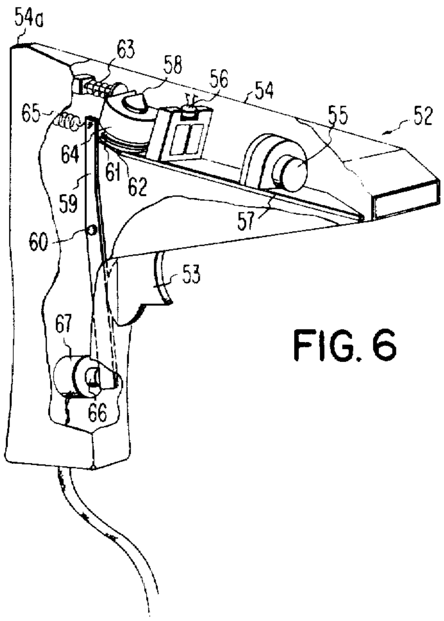
FIG. 6 is a cutaway view of a preferred form of optical scanner utilized in the subject system.

In FIG. 6 is shown a hand-held pistol 52 for utilization as an optical scanner or transducer in the subject system. From the human engineering standpoint, a pistol configuration provides a natural means for obtaining accurate training on a target. The trigger 53 serves as the initiator of the mechanical sweep, the barrel 54 is used for sighting or aiming, while the handle 54*a* serves as a simple vertical reference and facilitates steadiness while triggering. In FIG. 6, a lens 55-photocell 56 arrangement is mounted on scanning arm 57 which is pivoted about shaft 58. Shaft 58 is rotatably secured in the barrel 54. Application of pressure to the trigger 53 causes the linkage 59 to pivot about shaft 60 and to contact cam ledge 61. Continued pressure on the trigger 53 causes the linkage 59 acting upon the cam ledge 61 to cause the scanning arm 57 to swing to its leftmost scanning position. As the linkage 59 moves forward, it is caused by the surface 62 to steadily move away from contact with the contact cam ledge 61. At some point, the linkage 59 is disengaged from the contact cam ledge 61 and the scanning arm 57 is caused to fly back to its rightmost position by action of the spring 63 which is compressed by a face (not shown) on the cam 64 as the scanning arm is moved to its leftmost position. When the trigger 53 is released, a spring 65 causes the linkage 59 to move back into position to engage the contact cam ledge 61 upon reapplication of pressure to the trigger 53. Depressing of the trigger also results in the lower portion of linkage 59 contacting the actuator 66 of a microswitch 67 mounted in the handle 54*a*. This switch is used to gate on the photocell 55 only when the linkage 59 is disengaged from the contact cam ledge 61. When this occurs the linkage 59 causes the actuator to be depressed to its rearmost position which initiates the microswitch thereby gating out the output of the photocell as the arm 57 sweeps from left to right.

There are, of course, many methods for obtaining a mechanical scanning motion. In this application, consistency of scan, that is, speed from scan to scan, as well as within scans, is highly desirable even though, as hereinafter described, a self-clocking code is provided. Approaches involving rotating mirrors and moving slitted belts in front of the photocell (similar to a focal plane shutter) were considered and dropped in favor of a simple swinging beam.

The transducer employed to convert the light signals to electrical signals has been referred to as a photocell. While any member of the large family of light sensitive devices may conceivably be employed, the requirements of this particular application dictated a careful choice. A consideration of spectral match with the human eye as well as high sensitivity pointed unmistakeably to a photomultiplier tube. However, a photomultiplier was not chosen because of its fragility and voltage requirements. That is, since the scanner is to be hand-held, it would be subject to dropping and other mechanical abuse. Furthermore, it would seem undesirable to hold a device in the hand that requires close to 1,000 volts to operate.

While any number of photosensitive devices may be employed successfully in the subject system, it was found that the Hoffman EA7E2 Photo-Voltaic Detector Capsule worked quite admirably. Being silicon, its dark current is very low (maximum of 10 micro-amps with a one volt negative bias at 55° C.) The dark current also displays a lower temperature coefficient than would a direct germanium unit. The response time is less than 10 micro-seconds which is faster than required in most applications.

One of the greatest problems in perfecting a workable system in accordance with the subject invention was that of the choice of a proper binary code. The code to function adequately in the subject system should be as compact as possible leaving the maximum space for the text of the document, yet staying within reasonable resolution requirements. Also, there should be ease of typing and reproduction and it should be readable by a single photocell. Likewise, it should have low sensitivity to scanning speed variations, vertical and azimuthal alignment errors, change in enlargement ratio, and to film density, light intensity and contrast ratio variations. Finally, it should lead to a simple, self-clocking approach; since the sensing device will be hand-held and so many variables exist in going from the type bar code characters to the screen image, the system should be asynchronous.

Figure 8:
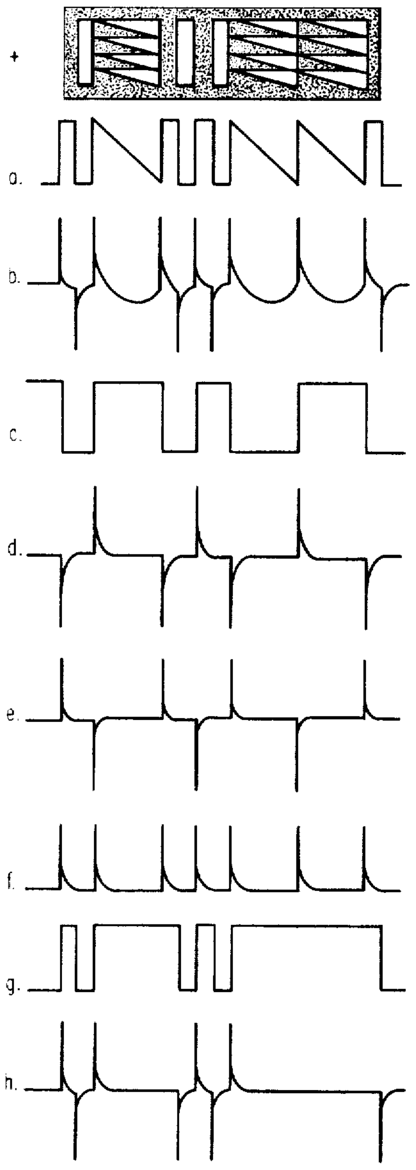
FIG. 8 is a view showing a preferred form of self-clocking optical coding along with timing signals associated therewith as provided by the system of FIG. 7.

At the top of FIG. 8 is shown a binary code which was chosen and possesses all of these necessary characteristics. The code shown was chosen additionally for the simplicity of the electronics required for discrimination between "1" and "0," as well as the self-timing feature which it possesses. The binary number represented is 101100. The last vertical line simply completes the box. The plus sign preceding the code is an optical precursor, which can aid in aiming and aligning the scanning pistol before the code is "read in." A clear plastic member can be attached to the pistol and engraved with a similar plus sign to be aligned with and placed directly over the sign on the code. It is only necessary for one of the four vertical "flags" comprising each zero to be read by the photocell. The other three are provided to accommodate for possible vertical misalignment as well as for differences in the optical reduction and enlargement ratios employed in the photographic processing of images. The electrical output of a scan is portrayed at "*a*" in FIG. 8. After differentiation, this signal is shown at "*b*." Thus, it can be seen that the positive pulses provide the self-timing since there is a positive pulse before every bit. The address itself may be deduced from the negative pulses. That is, at the end of every bit, a decision can be made as to which binary character was read. If a negative pulse has occurred, then a "1" was read, while lack of a negative pulse is interpreted as a "0."

Figure 7:
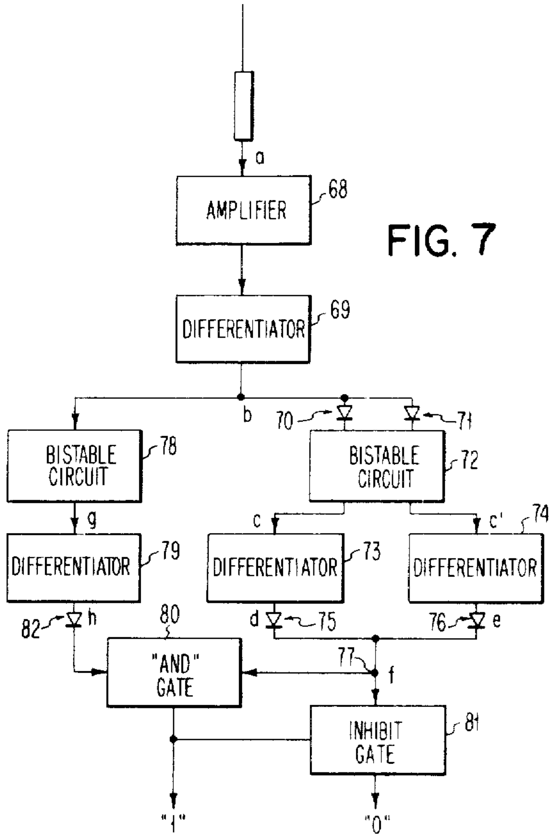
FIG. 7 is a block diagram of one asynchronous electronic system for decoding the self-clocking optical code utilized in the subject system.

There are many possible methods for electrically decoding this signal. A block diagram of a simple asynchronous system is shown in FIG. 7. The appearance of the electrical signal at various points in the system is shown in FIG. 8 by the use of the same lettering system. After passing through an amplifier 68 and a differentiator 69 (a simple RC network suffices for the latter and can be readily incorporated into the amplifier), the signal is divided into two alternate paths. Following the right-hand path, the signal is rectified by two diodes 70 and 71 and the positive pulses are fed to two inputs of a bistable circuit 72. By this means, the positive pulses will always change the state of the bistable circuit 72 regardless of its initial state and regardless of the sequence of "1's" and "0's." This may be seen by the output as illustrated at FIG. 8*c*. The output at point *c'* is the identical pattern with polarity reversed, derived from the other side of the bistable circuit. After differentiation of these signals in differentiators 73 and 74, which prevents drift and negates the need of setting D.C. levels, they appear as illustrated at 8*d* and 8*e*. When these signals are rectified by diodes 75 and 76 and are mixed, the positive pulses marking the beginning of each bit appear at junction 77, as illustrated at FIG. 8*f*.

In the left path of FIG. 7 the signal is fed to one input of a bistable circuit 78 which will be reset by the positive pulses at the beginning of each bit so that it will always change state when a negative pulse occurs. This may be seen at FIG. 8*g* which shows the output from the bistable circuit 78. When this signal is differentiated in differentiator 79, rectified in diode 82 and fed, with the signal appearing at junction 77, into an AND gate 80 there will be an output pulse at the end of every "1" bit only. This information, in conjunction with the timing pulses available at junction 77, is readily interpretable in terms of "1's" and "0's." If desired, a positive indication of a "0" may be obtained by feeding the "1's" output as an inhibit signal to a gate 81 which also receives the timing pulses from junction 77. Then, in the absence of a "1," this gate 81 will have an output indicating a "0."

The output from the signal interpret means of FIG. 7 may be fed into any conventional serial input decoder and control signals for the appropriate system derived such that the store retrieves information from the designated address and presents it for transmission to the viewing screen.

It will, of course, be understood that while the particular code chosen has the desirable feature of being self-clocking, other codes could be employed. For instance, man-machine readable codes such as the E13B code utilized by members of the American Bankers Association or "Fred" could be utilized. A good description and discussion of these codes is contained in Machine Reading Data Processing, Oct.-Dec., 1960, pp. 208–223.

Thus, there has been provided an information storage and retrieval system which is conducive to hierarchical searching by an operator. That is, he is presented with a series of hierarchical indexes, the next lower more detailed level being displayed to him as a result of his choice of a category from the previous, more general display. By these means, what may be called a man-machine conversation is facilitated. This conversation starts when an operator of a console chooses a mode of operation which then actuates the first display in the chosen mode. The conversation is then carried on by the operator telling the machine his next choice from each document displayed.

It will be noted that the heretofore described system presents a simple method of retrieving a document without the necessity of keying in search criteria which might introduce operator error and additionally would be quite a tedious task in the case of a large store wherein a large number of search data is contained. Moreover, in the heretofore described system, unlike the systems wherein information is projected onto a viewing screen which is divided into a number of touch sensitive areas, the addresses can be assigned to items being placed in the file in any convenient manner, e.g., chronologically. Thus, a given document is referenced on a display simply by means of its binary coded address. This obviates the necessity for programming the computer for each index type display, for example, to refer a specific sub-area of the display screen to the given item in the file. Therefore, preparing additional displays or revising them is greatly simplified. Furthermore, a great savings of memory capacity may be realized. Likewise, displays of graphic material need not be artificially distorted in order that a referenced area fall within a keyed-sub-area of the display. Finally, a large associative memory which is normally associated with the multi-discrete area projection screen and the previously mentioned system wherein a light pencil is utilized in conjunction with a cathode ray tube sweep, is not needed.

While the invention has been particularly shown and described with reference to a preferred embodiment thereof, it will be understood by those skilled in the art that various changes in the form and details may be made therein without departing from the spirit and scope of the invention.

What is claimed is:

1. A system for searching for and displaying selected information, comprising:
 a viewing screen,
 a plurality of information bearing records,
 means for displaying the information content of a selected one of said information bearing records on said viewing screen,
 means for scanning a portion of the information displayed on said viewing screen to produce a search control signal, and
 means responsive to said search control signal to position another information bearing record in operable association with said displaying means.

2. A system for searching for and displaying selected information, comprising:
 a viewing screen,
 a plurality of information bearing records, the information content of each including at least one category of human readable information,
 an optical code associated with each category of human readable information,
 means for displaying the information content of a selected one of said information bearing records on said viewing screen,
 means for selectively scanning the optical code portions of the information displayed on said viewing screen to produce a search control signal, and
 means responsive to said search control signal to position another information bearing record in operable association with said displaying means.

3. A system for searching for and displaying selected information, comprising:
 a viewing screen,
 a plurality of information bearing records, the information content of each including at least one category of human readable information,
 an optical code associated with each category of human readable information,
 means for displaying the information content of a selected one of said information bearing records on said viewing screen,
 means for scanning the optical code portion of the information displayed on said viewing screen about which further information is desired to produce a search control signal, and
 means responsive to said search control signal to position an information bearing record containing said desired further information in operable association with said displaying means.

4. A system for searching for and displaying selected information, comprising:

a viewing screen,
 a plurality of information bearing records, the information content of each including at least one category of human readable information,
 an optical code associated with each category of human readable information,
 a display means,
 means for initially positioning a selected one of said information bearing records in operable association with said display means to thereby display the contents thereof on said viewing screen,
 opto-electrical means for scanning the optical code portion of the information displayed about which further information is desired operable to produce an electrical output indicative of the code scanned,
 decoding means receptive of said electrical output, and
 record control means electrically connected to said decoding means operable to position an information bearing record containing said desired further information in operable association with said display means.

5. The system of claim 4 wherein the opto-electrical means is a hand-held optical pistol scanner of the swinging beam type.

6. A system for searching for and displaying selected information, comprising:
 a viewing screen,
 a plurality of information bearing records, the information content of each including at least one category of human readable information,
 a self-clocking optical code associated with each category of human readable information,
 a display means,
 means for initially positioning a selected one of said information bearing records in operable association with said display means to thereby display the contents thereof on said viewing screen,
 optical pistol scanner means for scanning the optical code portion of the information displayed about which further information is desired operable to produce an electrical output indicative of the code scanned,
 asynchronous decoding means receptive of said electrical output, and
 record control means electrically connected to said decoding means operable to position an information bearing record containing said desired further information in operable association with said display means.

References Cited by the Examiner

UNITED STATES PATENTS

| | | | |
|---|---|---|---|
| 2,849,707 | 8/1958 | White | 343—7.3 |
| 3,117,491 | 1/1964 | Stern | 88—24 |
| 3,166,636 | 1/1965 | Rutland et al. | 178—24 |

NORTON ANSHER, *Primary Examiner.*

HAROLD H. FLANDERS, *Assistant Examiner.*